United States Patent
Takeuchi

(12) 
(10) Patent No.: US 7,567,632 B2
(45) Date of Patent: Jul. 28, 2009

(54) SPECIFIC PHASE POSITION DETECTION CIRCUIT AND METHOD OF THE SAME

(75) Inventor: Kesatoshi Takeuchi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 590 days.

(21) Appl. No.: 11/354,829

(22) Filed: Feb. 16, 2006

(65) Prior Publication Data

US 2006/0215797 A1    Sep. 28, 2006

(30) Foreign Application Priority Data

Mar. 9, 2005    (JP)    ............... 2005-064691

(51) Int. Cl.
*H03D 1/00* (2006.01)
*H04L 27/06* (2006.01)

(52) U.S. Cl. .................. 375/340; 375/342; 375/371; 340/825.57; 340/825.7; 340/825.72

(58) Field of Classification Search .............. 375/371, 375/354, 340, 342; 354/158; 324/76.79, 324/76.77; 340/825.57, 825.7, 825.72; 345/158
See application file for complete search history.

(56) References Cited

U.S. PATENT DOCUMENTS 5,995,520 A    11/1999    Uchiki et al.
6,130,662 A *  10/2000    Umeda ............... 345/158

FOREIGN PATENT DOCUMENTS

| JP | A 5-217682 | 8/1993 |
| JP | A 09-238169 | 9/1997 |
| JP | A 2001-223668 | 8/2001 |
| JP | A 2003-173890 | 6/2003 |

* cited by examiner

*Primary Examiner*—Phuong Phu
(74) *Attorney, Agent, or Firm*—Oliff & Berridge, PLC

(57) ABSTRACT

A specific phase position detection circuit of the invention includes: a measurement unit that detects two time positions where a signal level of an analog signal is matched with a preset threshold value, as a first reference position and a second reference position in each cycle of the analog signal, and measures a time length between the first reference position and the second reference position, as a reference time period; a computation unit that computes a time period at a preset rate to the reference time period measured in each previous cycle, as an additional time period in each current cycle of the analog signal; and a detection unit that detects a time position shifted from the first reference position detected in a current cycle by the additional time period computed by the computation unit, as the specific phase position, and outputs a detection signal representing the detected specific phase position. The positions having the substantially fixed positional relations to the peak positions are detectable as the specific phase positions in the respective cycles of an analog signal. The technique of the invention thus enables accurate specification of the peak positions even in the analog signal with varying amplitude.

8 Claims, 8 Drawing Sheets

Fig.7
| Waveform | | Operation Value |
|---|---|---|
| 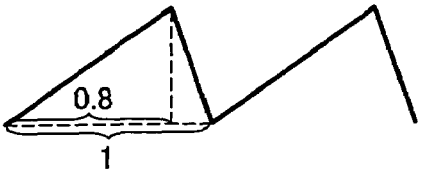 | Sawtooth Wave1 | 0.7 |
| 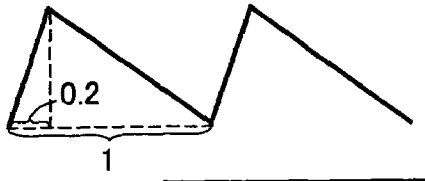 | Sawtooth Wave2 | 0.1 |
| 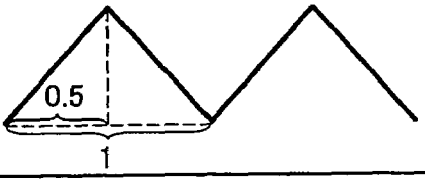 | Triangular Wave | 0.4 |
|  | Sinusoidal Wave | 0.4 |

SPECIFIC PHASE POSITION DETECTION CIRCUIT AND METHOD OF THE SAME

BACKGROUND OF THE INVENTION

1. Field of the Invention

The present invention relates to a technique of specifying peak positions of an analog signal. More specifically the invention pertains to a technique of accurately specifying peak positions even in an analog signal with varying amplitude.

2. Description of the Related Art

Recently proposed projectors have a resonant circuit including a coil and a capacitor for lighting control of a discharge lamp. In these projectors, the discharge lamp is connected in parallel with the capacitor of the resonant circuit. The frequency of a voltage applied to the resonant circuit is adjusted to a resonant frequency of the resonant circuit. A required voltage for discharge is then applied to the discharge lamp connected to the resonant circuit to light on the discharge lamp.

One example of such projectors is disclosed in Japanese Patent Laid-Open Gazette No. H05-217682.

In the projector having the resonant circuit for lighting control of the discharge lamp, the resonant frequency of the resonant circuit may be varied by wear of a discharge gap in the discharge lamp or by a change of temperature characteristic of the discharge lamp. Application of the voltage having the fixed frequency to the resonant circuit under the condition of the varying resonant frequency causes failed application of the required voltage to the discharge lamp and does not keep the discharge lamp on. In order to keep the discharge lamp on even under the condition of the varying resonant frequency, the projector is demanded to change the frequency of the applied voltage with a variation in resonant frequency.

A proposed projector to meet this demand changes the frequency of the voltage applied to the resonant circuit with a variation in electric current generated in the resonant circuit. The lighting control of this proposed projector is described briefly.

In the projector having the discharge lamp connected to the resonant circuit, as the frequency of the voltage applied to the resonant circuit is gradually increased to the resonant frequency, the discharge lamp starts discharge and high electric current runs through the resonant circuit. The electric current in the resonant circuit increases with an increase in frequency of the applied voltage and reaches the maximum at the resonant frequency.

In this proposed projector, an electric current sensor measures the electric current in the resonant circuit. When the measured electric current reaches or exceeds a preset level, the frequency of the applied voltage is varied to maintain a preset phase difference between the phase of the electric current in the resonant circuit and the phase of the applied voltage.

This regulates the frequency of the applied voltage to keep the electric current at or over the preset level in the resonant circuit even under the condition of the varying resonant frequency. This enables the discharge lamp to be stably kept on.

The projector makes comparison between the phase of the electric current in the resonant circuit and the phase of the applied voltage to detect a phase difference. It is preferable to make the comparison at the positions of respective peak levels (hereafter referred to as 'peak positions'). Identification of the peak positions, however, has much difficulty, and the phase comparison may be performed according to the following procedure.

FIGS. 8(A) and 8(B) show a process of making comparison between the phase of a voltage applied to a resonant circuit and the phase of electric current in the resonant circuit (resonant circuit electric current) in a prior art projector.

FIG. 8(A) shows the waveform of the voltage applied to the resonant circuit with phase detection points. FIG. 8(B) shows the waveform of the resonant circuit electric current with phase detection points. In FIGS. 8(A) and 8(B), the abscissa denotes the time elapsed (cycles N and (N+1) and part of cycle (N+2)), whereas the ordinate denotes a variation in electric current having the center of the amplitude set at a level '0'. The open triangles represent peak positions and the closed triangles represent reference positions detected for phase comparison in place of the peak positions (hereafter referred to as 'phase detection points'). The voltage waveform and the electric current waveform have both positive and negative peaks. For the simplicity of explanation, the following description regards only the positive peaks.

The phase comparison process in the prior art projector sets a threshold value Th1 of the applied voltage and generates a comparison signal that rises to a high level when the applied voltage reaches or exceeds the preset threshold value Th1 as shown in FIG. 8(A). A rising position of the comparison signal is detected and specified as each phase detection point.

The phase comparison process also sets a threshold value Th2 of the resonant circuit electric current and generates a comparison signal that also rises to a high level when the resonant circuit electric current reaches or exceeds the preset threshold value Th2 as shown in FIG. 8(B). A rising position of the comparison signal is detected and specified as each phase detection point.

The phase comparison process then compares the phase detection points of the applied voltage and the phase detection points of the resonant circuit electric current, instead of the respective peak positions, to detect a phase difference between the applied voltage and the resonant circuit electric current.

The prior art phase comparison process described above, however, has some drawbacks.

With an increase in frequency of the applied voltage to the resonant frequency, the amplitude of the resonant circuit electric current gradually increases as shown in FIG. 8(B). When a time period between a start position (0) and a ½ cycle position (π) in each cycle of the resonant circuit electric current is assumed to be '1', the time length between the peak position and the phase detection point is varied, for example, as '0.1' through '0.3' to '0.4' as shown in FIG. 8(B). Namely the phase detection points of the resonant circuit electric current have varied positional relations to the corresponding peak positions.

When a time period between a start position (0) and a ½ cycle position (π) in each cycle of the applied voltage is assumed to be '1', on the other hand, the time length between the peak position and the phase detection point is fixed to, for example, '0.1' as shown in FIG. 8(A). Namely the phase detection points of the applied voltage have fixed positional relation to the corresponding peak positions.

The phase difference between the applied voltage and the resonant circuit electric current detected by the phase comparison at the respective phase detection points is significantly different from the phase difference detected by the phase comparison at the actual peak positions. The inaccurate detection of the phase difference interferes with precise adjustment of the frequency of the applied voltage and prevents stable lighting of the discharge lamp.

This problem is not characteristic of the phase comparison but also arises in detection of phase detection points as peak positions of an analog signal representing a variation in electric current or voltage in the resonant circuit. The phase detection points have varied positional relations to the actual peak positions. Detection of such phase detection points as the peak positions may accordingly have an error out of a preset allowable range.

Such problems are not restricted to the analog signals in the resonant circuit but may arise in detection of peak positions in any analog signal having varying amplitude.

SUMMARY OF THE INVENTION

The object of the invention is thus to eliminate the drawbacks of the prior art technique and to provide a technique of accurately specifying peak positions even in an analog signal with varying amplitude.

In order to attain at least part of the above and the other related objects, the present invention is directed to a first specific phase position detection circuit that detects a time position to have a desired phase relative to a peak position of a periodical analog signal and outputs a detection signal representing the detected time position.

Even when the analog signal has the varying amplitude, the first specific phase position detection circuit of the invention detects the time position to have the desired phase relative to the peak position of the analog signal. The peak position of the analog signal can thus be specified accurately, based on the detected time position. The first specific phase position detection circuit outputs the detection signal representing the detected time position. A circuit receiving the output detection signal can accordingly perform adequate control based on the accurately specified peak position.

The present invention is also directed to a second specific phase position detection circuit that detects a time position to have a specific phase as a specific phase position in each cycle of an analog signal. The second specific phase position detection circuit includes: a first detection unit that detects a time position where a signal level of the analog signal is matched with a preset threshold value, as a reference position; a measurement unit that measures a time length based on the detected reference position, as a reference time period; a computation unit that computes a time period at a preset rate to the measured reference time period, as an additional time period; and a second detection unit that detects a time position based on the detected reference position and the computed additional time period, as the specific phase position, and outputs a detection signal representing the detected specific phase position.

The peak position is located at a specific rate to the reference time period in each cycle of the analog signal. For example, when the analog signal is a sinusoidal signal and the reference time period represents a time length between two reference positions, the peak position is a center (50%) of the reference time period. The time position based on the reference positions and the additional time period at the preset rate to the reference time period has a substantially fixed relative position to the peak position even under the condition of varying amplitude of the analog signal. The peak positions of the analog signal can thus be specified with high accuracy, based on the detected time positions.

The present invention is further directed to a third specific phase position detection circuit that detects a time position to have a specific phase as a specific phase position in each cycle of an analog signal. The third specific phase position detection circuit includes: a measurement unit that detects two time positions where a signal level of the analog signal is matched with a preset first threshold value, as a first reference position and a second reference position in each cycle of the analog signal, and measures a time length between the first reference position and the second reference position, as a reference time period; a computation unit that computes a time period at a preset rate to the reference time period measured in each previous cycle, as an additional time period in each current cycle of the analog signal; and a detection unit that detects a time position shifted from the first reference position detected in a current cycle by the additional time period computed by the computation unit, as the specific phase position, and outputs a detection signal representing the detected specific phase position.

The third specific phase position detection circuit of the invention measures the time length between the first and the second reference positions having the signal level matched with the preset first threshold value as the reference time period in each cycle of the analog signal and computes the additional time period at the preset rate to the measured reference time period. The time position shifted from the first reference position by the computed additional time period in each of next and subsequent cycles of the analog signal is close to the time position shifted by a fixed rate from the peak position in each cycle of the analog signal, regardless of the varying amplitude of the analog signal.

When the analog signal has a relatively small variation in amplitude and the additional time period in a certain cycle of the analog signal is computed from the reference time period measured in a cycle relatively close to the certain cycle, the time position shifted by the computed additional time period from the first reference position in the certain cycle is substantially identical with the time position shifted by a fixed rate from the peak position in each cycle of the analog signal.

The positions having the substantially fixed positional relations to the peak positions are detectable as the specific phase positions in the respective cycles of an analog signal. The third specific phase position detection circuit of this arrangement thus enables accurate specification of the peak positions even in the analog signal with varying amplitude.

In any of the first through the third specific phase position detection circuits, the analog signal may be output from a resonant circuit.

The analog signal representing either an electric current value or a voltage value in a resonant circuit has the amplitude varying with a variation in frequency of a voltage applied to the resonant circuit. Application of the technique of the invention enables accurate specification of the peak positions even in the analog signal that is output from the resonant circuit and has the varying amplitude. Especially when the frequency of the applied voltage is increased to be sufficiently close to a resonant frequency of the resonant circuit, the analog signal has substantially constant amplitude. The peak positions can be specified with higher accuracy in such an analog signal.

Another application of the invention is a waveform generation circuit that includes one of the first through the third specific phase position detection circuits described above and outputs a voltage signal representing a voltage waveform to a resonant driving unit, which applies a voltage to the resonant circuit. The waveform generation circuit includes: a waveform generator that generates the voltage signal; a positional signal output unit that receives the voltage signal generated by the waveform generator, detects two time positions where a signal level of the voltage signal is matched with a preset second threshold value, as a third reference position and a fourth reference position in each cycle of the voltage signal, and outputs a positional signal representing at least either the third reference position or the fourth reference position; and a phase comparator that receives the detection signal output from the specific phase position detection circuit and the positional signal output from the positional signal output unit, compares the specific phase position represented by the received detection signal with either the third reference position or the fourth reference position represented by the received positional signal to detect a phase difference between the analog signal and the voltage signal, and outputs a phase difference signal representing the detected phase difference. The waveform generator receives the phase difference signal output from the phase comparator and adjusts a frequency of the voltage signal based on the phase difference represented by the received phase difference signal.

The voltage applied to the resonant circuit by the resonant driving unit has fixed amplitude irrespective of a variation in frequency of the applied voltage, unlike an analog signal of electric current or voltage measured in the resonant circuit. The positional relations of the third and the fourth reference positions having the signal level matched with the preset second threshold value to the peak positions are accordingly fixed in the respective cycles of the voltage signal. The analog signal, on the other hand, has the varying amplitude with a variation in frequency of the voltage signal. The detection signals output from the specific phase position detection circuit represent the specific phase positions having the substantially fixed positional relations to the peak positions in the respective cycles of the analog signal.

The phase comparator makes comparison between the phases of the voltage signal and the analog signal at the positions having the substantially fixed positional relations to the respective peak positions. Such comparison ensures accurate detection of the phase difference. The frequency of the voltage signal is adjustable according to the accurately detected phase difference. The frequency of the voltage applied to the resonant circuit is thus adjustable to keep the analog signal at a preset level.

Still another application of the invention is an electronic device that includes the waveform generation circuit described above.

The waveform generation circuit adjusts the frequency of the voltage applied to the resonant circuit to keep the analog signal at a preset level. In the electronic device under operation control of the resonant circuit, the analog signal can be kept at the preset level even under the condition of varying resonant frequency, for example, due to a change of the working environment. This arrangement ensures the stable operation control of the electronic device.

Another application of the invention is a discharge lamp control device that includes the waveform generation circuit described above and controls lighting of a discharge lamp. The discharge lamp is connected to the resonant circuit and is discharged and lit on by the voltage applied to the resonant circuit by the resonant driving unit.

The waveform generation circuit adjusts the frequency of the voltage applied to the resonant circuit to keep the analog signal at a preset level. The discharge lamp control device of the invention controls lighting of the discharge lamp that is discharged and lit on by the voltage applied to the resonant circuit. The discharge lamp control device of this application can thus keep the discharge lamp on even under the condition of varying resonant frequency in the discharge lamp.

Still another application of the invention is a projector that includes the discharge lamp control device described above and a discharge lamp.

Even under the condition of varying resonant frequency in the discharge lamp due to wear of a discharge gap or due to a variation in temperature characteristic, the projector of this application can keep the discharge lamp on to stably display a projected image on the screen.

The technique of the invention is not restricted to the circuits and the devices described above, for example, the specific phase position detection circuit described above, but is also applicable to corresponding methods, for example, a specific phase position detection method.

BRIEF DESCRIPTION OF THE DRAWINGS

FIG. 7 shows the waveforms of source signals and applied voltage signals and operation values set for the respective waveforms in Modified Example 1.

DESCRIPTION OF THE PREFERRED EMBODIMENTS

One mode of carrying out the invention is described below as a preferred embodiment in the following sequence:

A. Embodiment
   A1. System Configuration
   A2. Outline of Specification of Phase Detection Points
   A3. Concrete Phase Comparison Process
   A4. Effects of Embodiment
B. Modifications A. Embodiment A1. System Configuration FIG. 1 schematically illustrates the configuration of a liquid crystal projector 1000 in one embodiment of the invention.

Figure 1:
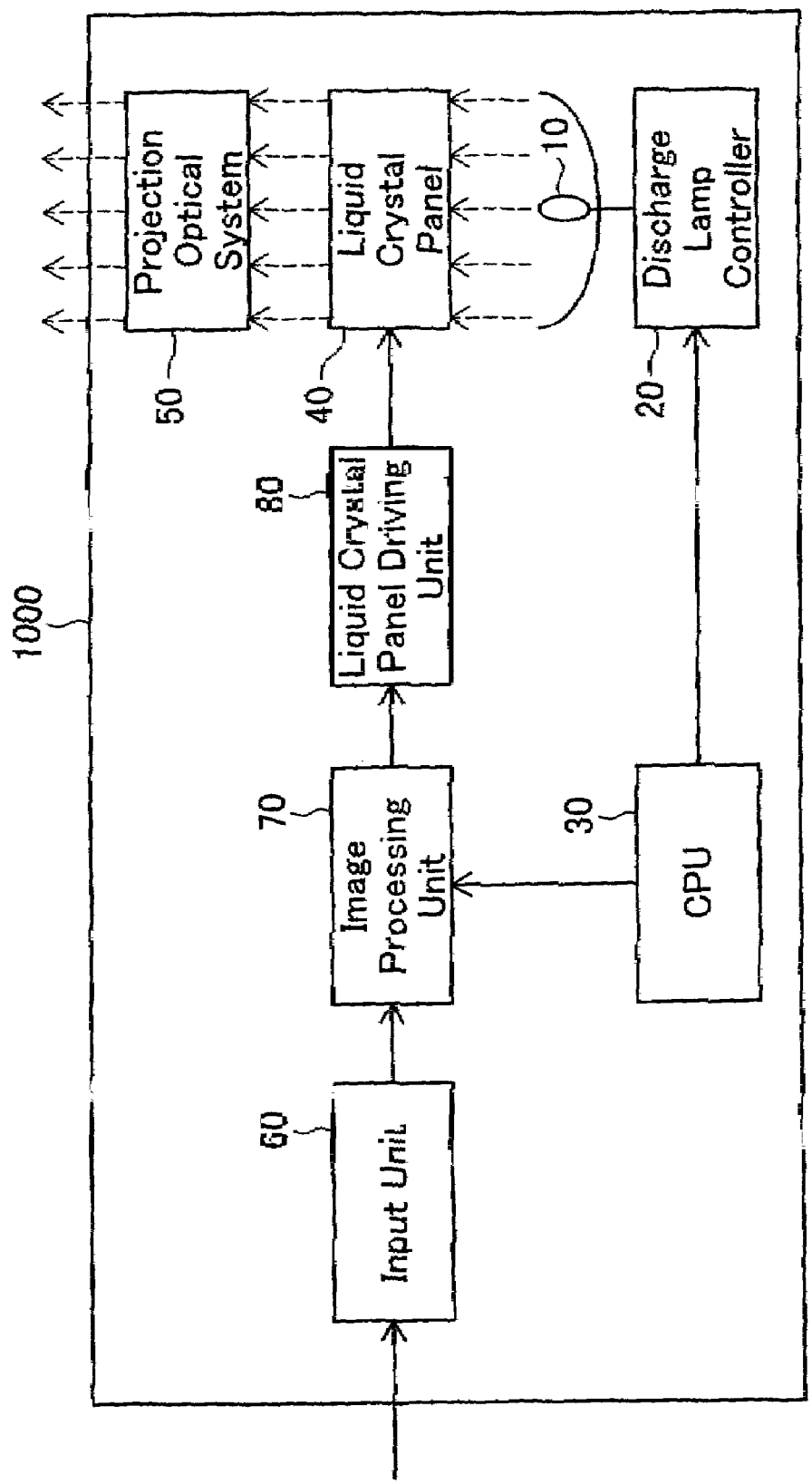
FIG. 1 schematically illustrates the configuration of a liquid crystal projector in one embodiment of the invention.

As illustrated in FIG. 1, the liquid crystal projector 1000 mainly has a discharge lamp 10, a discharge lamp controller 20 that controls lighting of the discharge lamp 10, a CPU 30, a liquid crystal panel 40, a projection optical system 50 including a projection lens, an input unit 60 that receives external analog signals, an image processing unit 70, and a liquid crystal panel driving unit 80 that drives the liquid crystal panel 40.

The input unit 60 receives analog video signals output from, for example, a video player, a TV set, or a personal computer, and converts the input analog video signals into digital video signals. The image processing unit 70 adjusts the input digital video signals to attain desired image display conditions (including contrast and sharpness) according to an instruction given by the CPU 30 and outputs the adjusted digital video signals to the liquid crystal panel driving unit 80.

The liquid crystal panel driving unit 80 drives the liquid crystal panel 40 in response to the input digital video signals.

The discharge lamp controller 20 lights on the discharge lamp 10 to emit illumination light, based on various parameters set by the CPU 30. The liquid crystal panel 40 modulates the illumination light according to image information. The projection optical system 50 projects the illumination light modulated by the liquid crystal panel 40 on a screen (not shown) to display an image.

The discharge lamp controller 20 of the embodiment is equivalent to the discharge lamp control device of the invention.

In the liquid crystal projector 1000, the discharge lamp controller 20 works to keep the discharge lamp 10 on even under the condition of wear of a discharge gap in the discharge lamp 10 or a variation in temperature characteristic.

Figure 2:
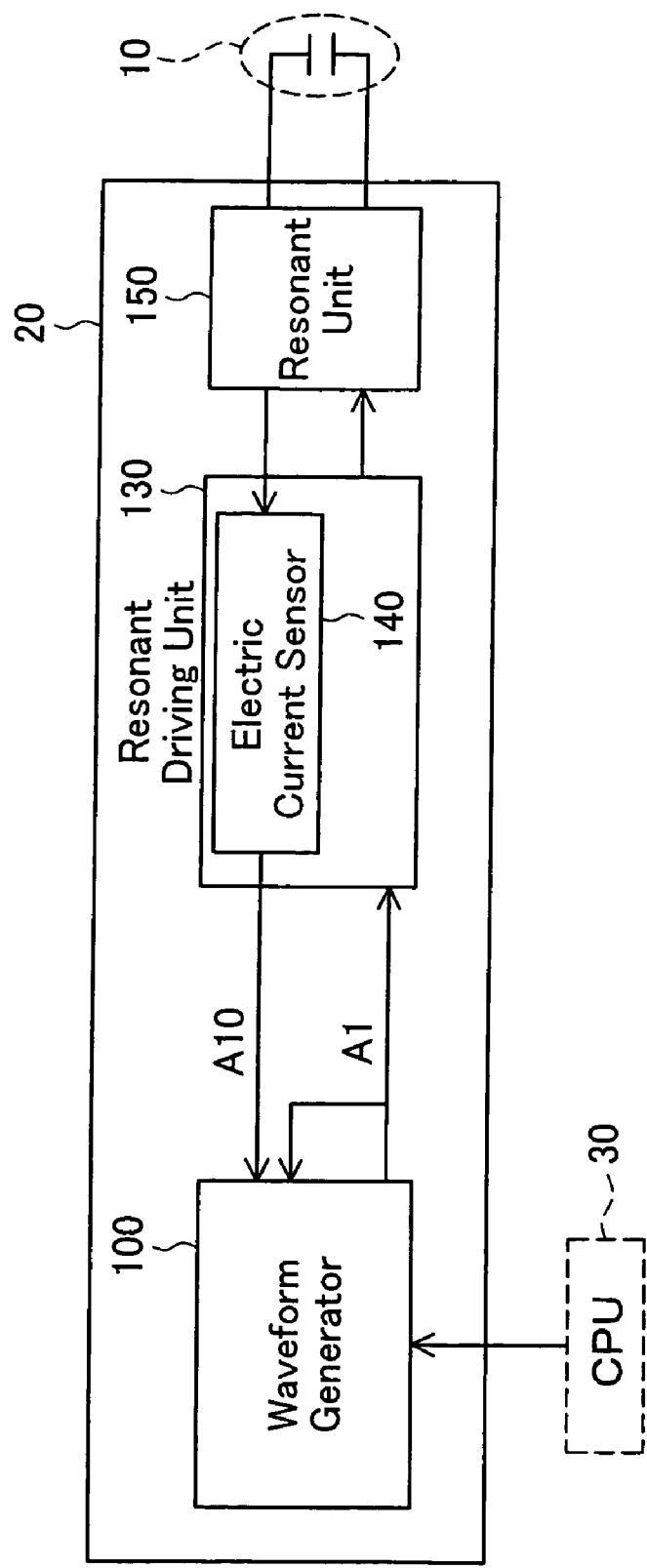
FIG. 2 schematically illustrates the structure of a discharge lamp controller included in the liquid crystal projector of FIG. 1.

FIG. 2 schematically illustrates the structure of the discharge lamp controller 20 included in the liquid crystal projector 1000 of FIG. 1.

As illustrated in FIG. 2, the discharge lamp controller 20 mainly includes a waveform generator 100, a resonant driving unit 130, and a resonant unit 150.

The resonant unit 150 includes a resonant coil and a resonant capacitor (not shown) and is connected to the discharge lamp 10 such that the resonant capacitor is arranged in parallel with the discharge lamp 10. The resonant unit 150 resonates with a voltage applied by the resonant driving unit 130 to light on the discharge lamp 10.

The resonant driving unit 130 receives a sinusoidal signal A1 output from the waveform generator 100 and applies a voltage corresponding to the received sinusoidal signal A1 onto the resonant unit 150. An electric current sensor 140 included in the resonant driving unit 130 detects an electric current signal A10 generated in the resonant unit 150.

The waveform generator 100 generates the sinusoidal signal A1 based on parameters set by the CPU 30 and outputs the generated sinusoidal signal A1 to the resonant driving unit 130. The waveform generator 100 inputs the electric current signal A10 detected by the electric current sensor 140 and feedback inputs the output sinusoidal signal A1. The waveform generator 100 compares the phase of the input electric current signal A10 with the phase of the input sinusoidal signal A1 to compute a phase difference and varies the frequency of the sinusoidal signal A1 according to the computed phase difference to maintain a preset phase difference.

The waveform generator 100 of the embodiment is equivalent to the waveform generation circuit of the invention.

As described above, the resonant driving unit 130 applies a voltage corresponding to the received sinusoidal signal A1 onto the resonant unit 150. The control of the waveform generator 100 enables the voltage applied to the resonant unit 150 and the electric current generated in the resonant unit 150 to maintain the preset phase difference. This keeps the discharge lamp 10 on.

In the description below, the preset phase difference is equal to '0'. Namely the control of the waveform generator 100 perfectly matches the phase of the voltage applied to the resonant unit 150 with the phase of the electric current generated in the resonant unit 150.

Figure 3:
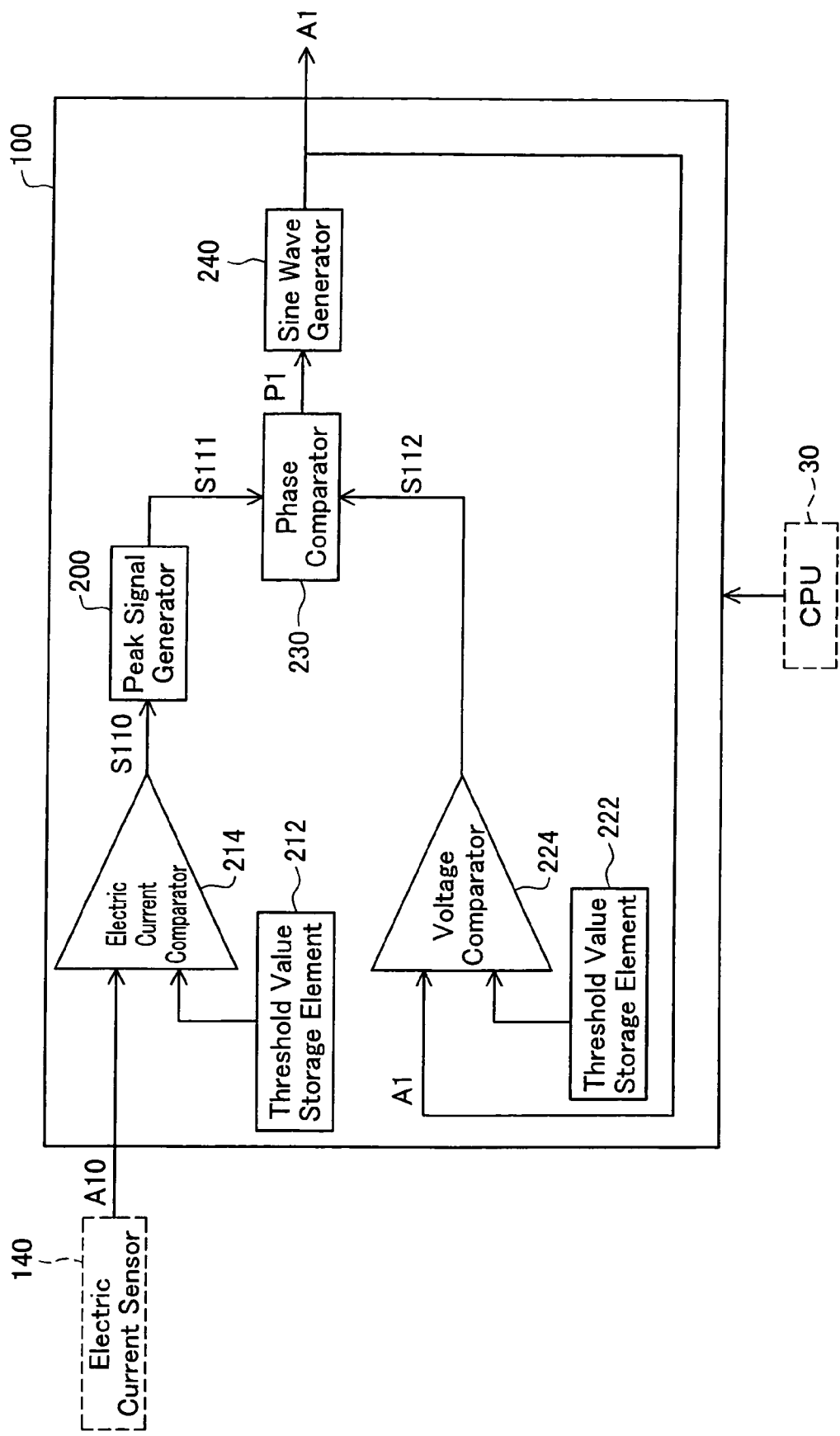
FIG. 3 shows the structure of a waveform generator included in the discharge lamp controller of FIG. 2.

FIG. 3 shows the structure of the waveform generator 100 included in the discharge lamp controller 20 of FIG. 2.

As illustrated in FIG. 3, the waveform generator 100 includes a peak signal generator 200 characteristic of the invention, threshold value storage elements 212 and 222, an electric current comparator 214, a voltage comparator 224, a phase comparator 230, and a sine wave generator 240.

The threshold value storage elements 212 and 222 respectively store a threshold value Th3 and a threshold value Th4 set by the CPU 30. The threshold values Th3 and Th4 are set respectively for the electric current signal A10 and for the sinusoidal signal A1, like the threshold values Th2 and Th1 shown in FIG. 8.

The electric current comparator 214 makes comparison between the threshold value Th3 stored in and input from the threshold value storage element 212 and the electric current signal A10 input from the electric current sensor 140, generates a comparison signal S110 that rises to a high level when the electric current signal A10 reaches or exceeds the threshold value Th3, and outputs the generated comparison signal S110 to the peak signal generator 200. The peak signal generator 200 generates a peak signal S111 from the input comparison signal S110 and outputs the generated peak signal S111 to the phase comparator 230. The generation of the peak signal S111 will be described in detail later.

The voltage comparator 224 makes comparison between the threshold value Th4 stored in and input from the threshold value storage element 222 and the sinusoidal signal A1 fed back from the sine wave generator 240, generates a comparison signal S112 that rises to a high level when the sinusoidal signal A1 reaches or exceeds the threshold value Th4, and outputs the generated comparison signal S112 to the phase comparator 230. The sinusoidal signal A1 output from the sine wave generator 240 has fixed amplitude. The output of the voltage comparator 224 accordingly does not require the peak detection performed in the peak signal generator 200.

The phase comparator 230 receives the peak signal S111 and the comparison signal S112, makes comparison between a phase detection point of the electric current signal A10 and a phase detection point of the sinusoidal signal A1, and detects a phase difference between the electric current signal A10 and the sinusoidal signal A1. The phase comparator 230 then outputs a phase difference signal P1 representing the detected phase difference to the sine wave generator 240. The sine wave generator 240 generates the sinusoidal signal A1, adjusts the frequency of the sinusoidal signal A1 to decrease the phase difference between the electric current signal A10 and the sinusoidal signal A1 according to the input phase difference signal P1, and outputs the sinusoidal signal A1 of the adjusted frequency.

The waveform generator 100 repeats the detection of the phase difference and the frequency adjustment of the sinusoidal signal A1 as described above, so as to eliminate the phase difference between the electric current signal A10 and the sinusoidal signal A1. Accurate detection of the phase difference is essential for the effective operation of the waveform generator 100. The peak signal generator 200 of this embodiment is designed to accurately detect the phase difference.

The peak signal generator 200, the voltage comparator 224, the phase comparator 230, and the sine wave generator 240 of the embodiment respectively correspond to the specific phase position detection circuit, the positional signal output unit, the phase comparator, and the waveform generator of the invention.

The structure of the peak signal generator 200 characteristic of the invention is described below.

Figure 4:
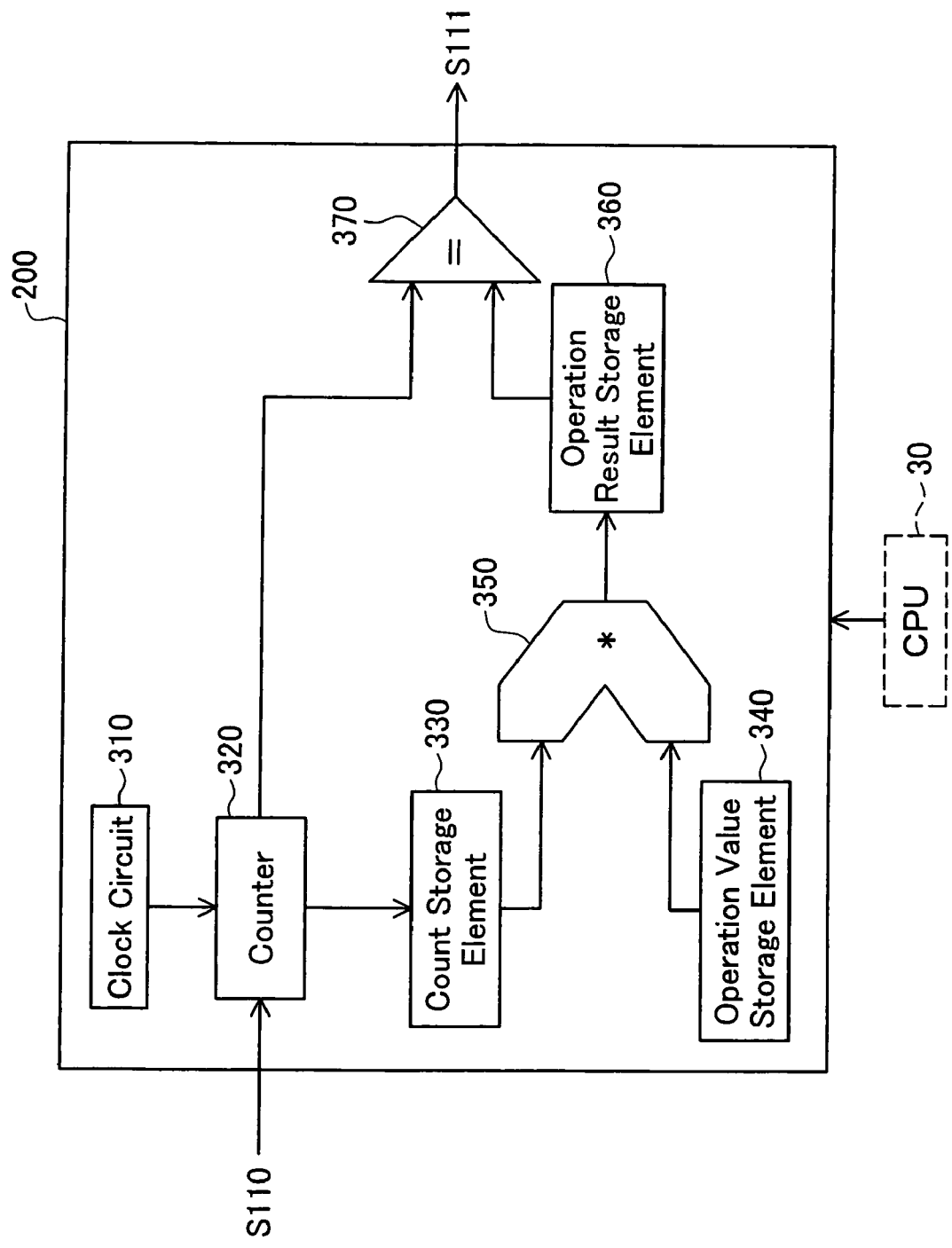
FIG. 4 shows the structure of a peak signal generator included in the waveform generator of FIG. 3.

FIG. 4 shows the structure of the peak signal generator 200 included in the waveform generator 100 of FIG. 3.

As illustrated in FIG. 4, the peak signal generator 200 includes a clock circuit 310, a counter 320, a count storage element 330, an operation value storage element 340, a multiplication circuit 350, an operation result storage element 360, and a comparator 370.

The counter 320 inputs the comparison signal S110, counts up the number of clocks in a high-level period of the input comparison signal S110 in response to each pulse of a clock signal output from the clock circuit 310, and successively outputs the accumulated number of clocks as an accumulated count to the comparator 370. At a fall of the comparison signal S110 from the high level to a low level, the counter 320 stores the accumulated count at the moment into the count storage element 330.

The operation value storage element 340 stores an operation value set by the CPU 30. The multiplication circuit 350 multiplies the count stored in the count storage element 330 by the operation value stored in the operation value storage element 340 and stores an operation result into the operation result storage element 360.

The comparator 370 generates and outputs a peak signal P1 and makes comparison between the count successively input from the counter 320 and the operation result stored in the operation result storage element 360. When the input count is matched with the operation result, the peak signal P1 rises to and is kept at a high level for a predetermined time period.

The counter 320, the multiplication circuit 350, and the comparator 370 of the embodiment respectively correspond to the measurement unit, the computation unit, and the detection unit of the invention.

The outline of specification of phase detection points in the present invention is described below with reference to FIG. 5, prior to description of the concrete phase comparison process in the peak signal generator 200.

A2. Outline of Specification of Phase Detection Points

Figure 5:
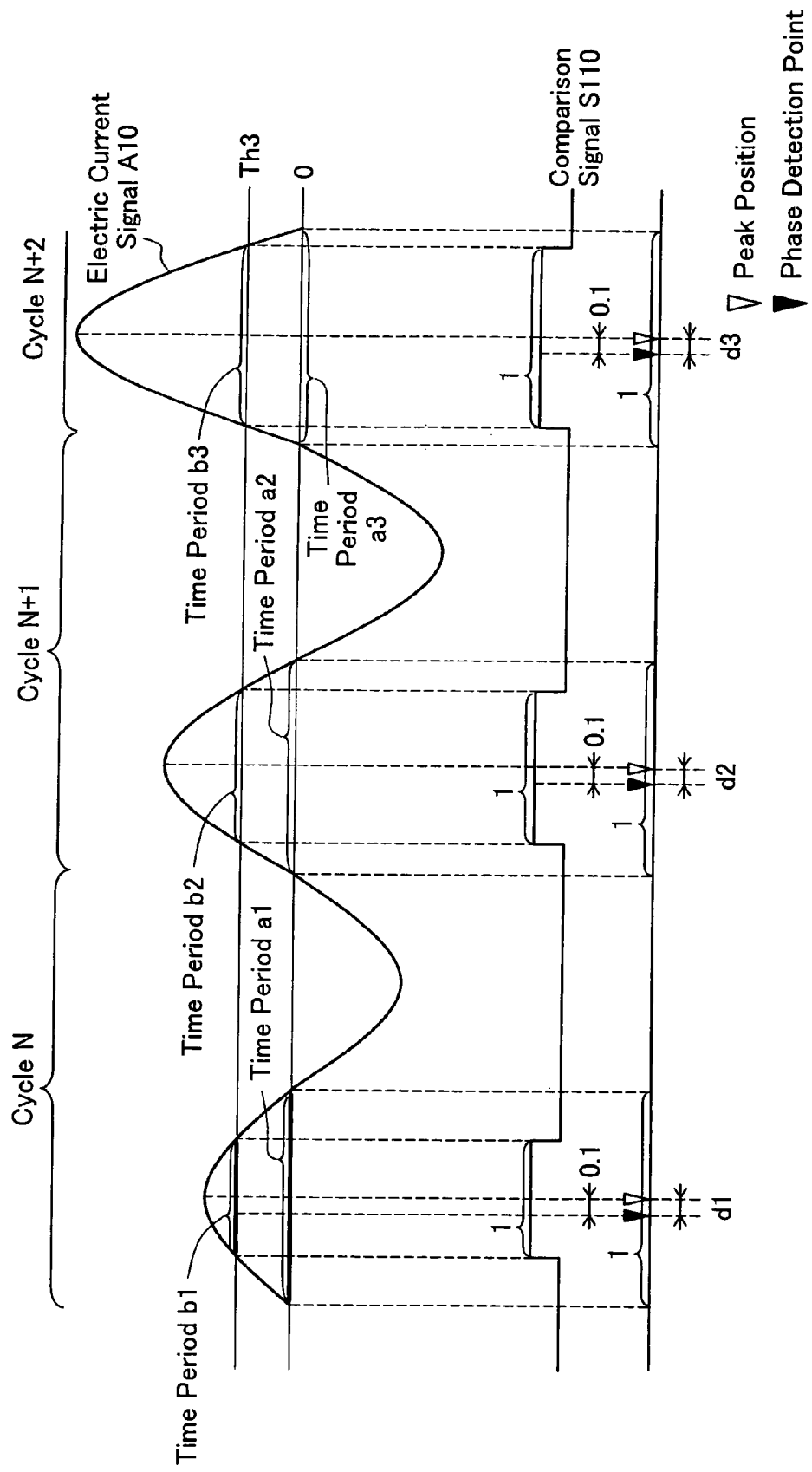
FIG. 5 shows outline of specification of phase detection points in an electric current signal A10.

FIG. 5 shows the outline of specification of phase detection points in the electric current signal A10.

The upper half of FIG. 5 shows the waveform of the electric current signal A10, and the lower half shows the waveform of the comparison signal S110 with phase detection points and peak positions. The abscissa, the ordinate, the open triangles, and the closed triangles in FIG. 5 have the same definitions as those of the abscissa, the ordinate, the open triangles, and the closed triangles in FIG. 8 and are thus not specifically described here.

In a cycle N (0 to $2\pi$), a time period 'a1' represents a ½ cycle (0 to $\pi$) and a time period 'b1' represents a high-level period of the comparison signal S110. Time periods 'a2' and 'b2' in a cycle (N+1) and time periods 'a3' and 'b3' in a cycle (N+2) have the same meanings as those of the time periods 'a1' and 'b1'.

In the sinusoidal electric current signal A10, a peak position or center position ($\pi/2$) of the time period 'a1' is identical with a center position of the time period 'b1'. A position shifted by '0.1' from the center position of the time period 'b1' assumed to be '1' is accordingly equivalent to a position shifted by a preset rate or time length 'd1' from the peak position of the time period 'a1' assumed to be '1'.

The position shifted by '0.1' from the center position of the time period 'b1' corresponds to a position of 20% before the center position when a specific time length between the start position and the center position of the time period 'b1' is set equal to 100%. This position is relatively close to the center position of the time period 'b1' and is also relatively close to the peak position of the time period 'a1'. The time length 'd1' is thus sufficiently close to '0.1'.

Similarly in the cycle (N+1), a position shifted by '0.1' from the center position of the time period 'b2' assumed to be '1' is equivalent to a position shifted by a preset rate or time length 'd2' from the peak position of the time period 'a2' assumed to be '1'. The time length 'd2' is thus sufficiently close to '0.1'. Similarly in the cycle (N+2), a time length 'd3' of FIG. 5 is sufficiently close to '0.1'.

The position shifted by '0.1' from the center position, that is, the position of 20% before the center position in the specific time length, in each high-level period of the comparison signal S110 is assumed to be a phase detection point. On this assumption, the phase detection points in the respective cycles of the electric current signal A10 are set at the positions shifted by approximately '0.1' from the respective peak positions ($\pi/2$) and have substantially fixed positional relations to the peak positions.

The position shifted by '0.1' from the center position in each high-level period of the comparison signal S110 is thus specified as a phase detection point of the electric current signal A10 in this invention.

The rising positions in the respective cycles of the comparison signal S112 are specified as phase detection points of the sinusoidal signal A1. The sinusoidal signal A1 has fixed amplitude like the applied voltage shown in FIG. 8(A). The phase detection points in the respective cycles of the sinusoidal signal A1 accordingly have the fixed positional relation to the respective peak positions.

Figure 8A:
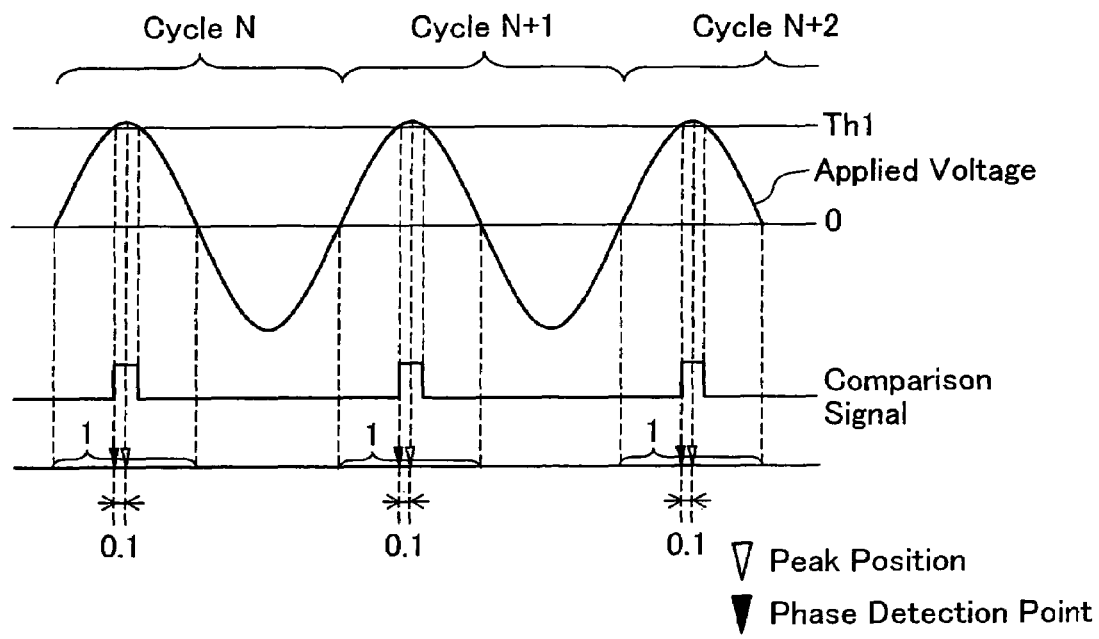
FIGS. 8(A) and 8(B) show a process of making comparison between the phase of a voltage applied to a resonant circuit and the phase of electric current in the resonant circuit in a prior art projector.
Figure 8B:
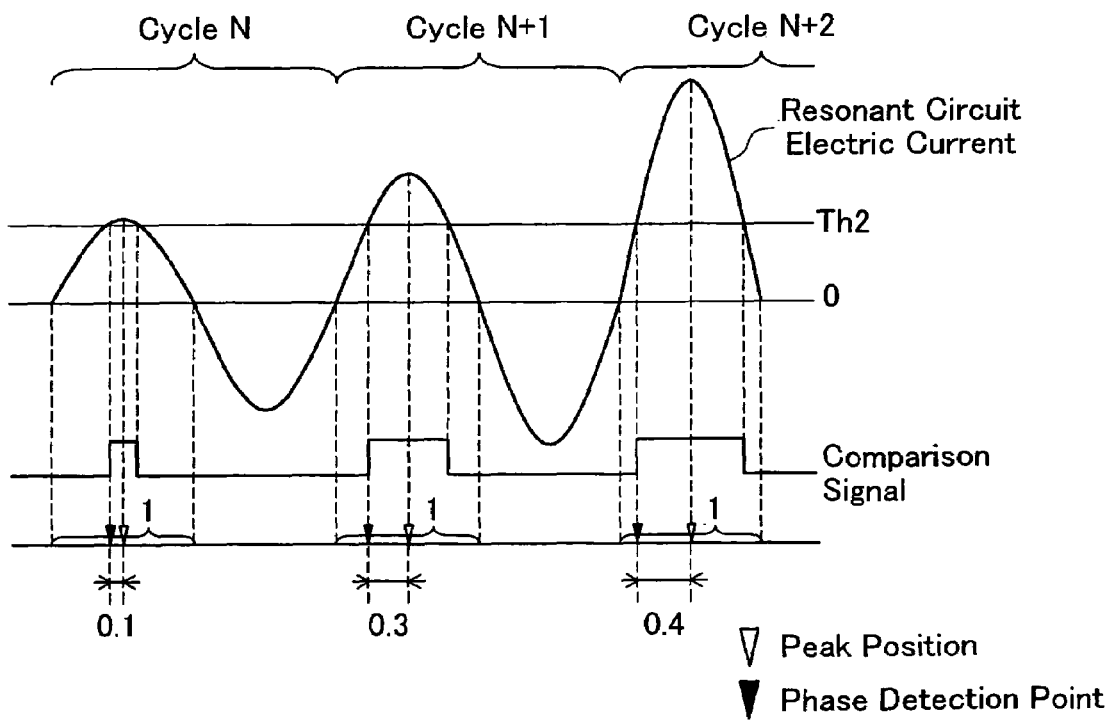

Like the threshold value Th1 shown in FIG. 8(A), the threshold value Th4 of the sinusoidal signal A1 is determined in advance to set a phase detection point at the position shifted by '0.1' from the peak position in each ½ cycle (0 to $\pi$) assumed to be '1'. Such setting enables phase comparison between the electric current signal A10 and the sinusoidal signal A1 at the practically identical relative positions to the corresponding peak positions. When the phase detection point of the electric current signal A10 is matched with the phase detection point of the sinusoidal signal A1, the peak position of the electric current signal A10 is practically identical with the peak position of the sinusoidal signal A1. This indicates that the phase of the electric current signal A10 is substantially identical with the phase of the sinusoidal signal A1.

The phase detection point is set at the position of 20% before the center position in the specific time length. When each high-level period of the comparison signal S110 is assumed to be 100%, the position of 40% from the rising position of the high-level period should thus be set to the phase detection point as shown by Equation (1) given below:

$$(100\% - 20\%)/2 = 40\% \tag{1}$$

The high-level period 'b2' in the cycle (N+1) is, however, determinable only after elapse of this period 'b2'. Namely the position of 40% from the rising position of the high-level period 'b2' is unidentifiable and the phase detection point in the cycle (N+1) is undeterminable before elapse of the high-level period 'b2'.

The procedure of the invention accordingly uses the determined high-level period 'b1' in the previous cycle N and sets the 40% position of the high-level period 'b1' from the rising position of the high-level period 'b2' to the phase detection point in the cycle (N+1).

The operation value stored in the operation value storage element 340 (see FIG. 4) represents a time rate between a rising position of each high-level period of the comparison signal S110 and a detected phase detection point when the high-level period of the comparison signal S110 is assumed to be '1'. When the phase detection point is set at the position of 40% from the rising position of each high-level period, the operation value of '0.4' is stored in the operation value storage element 340.

A3. Concrete Phase Comparison Process

Generation of the peak signal S111 from the electric current signal A10 to be input into the phase comparator 230 (see FIG. 3) is described with reference to FIGS. 4 and 6.

Figure 6:
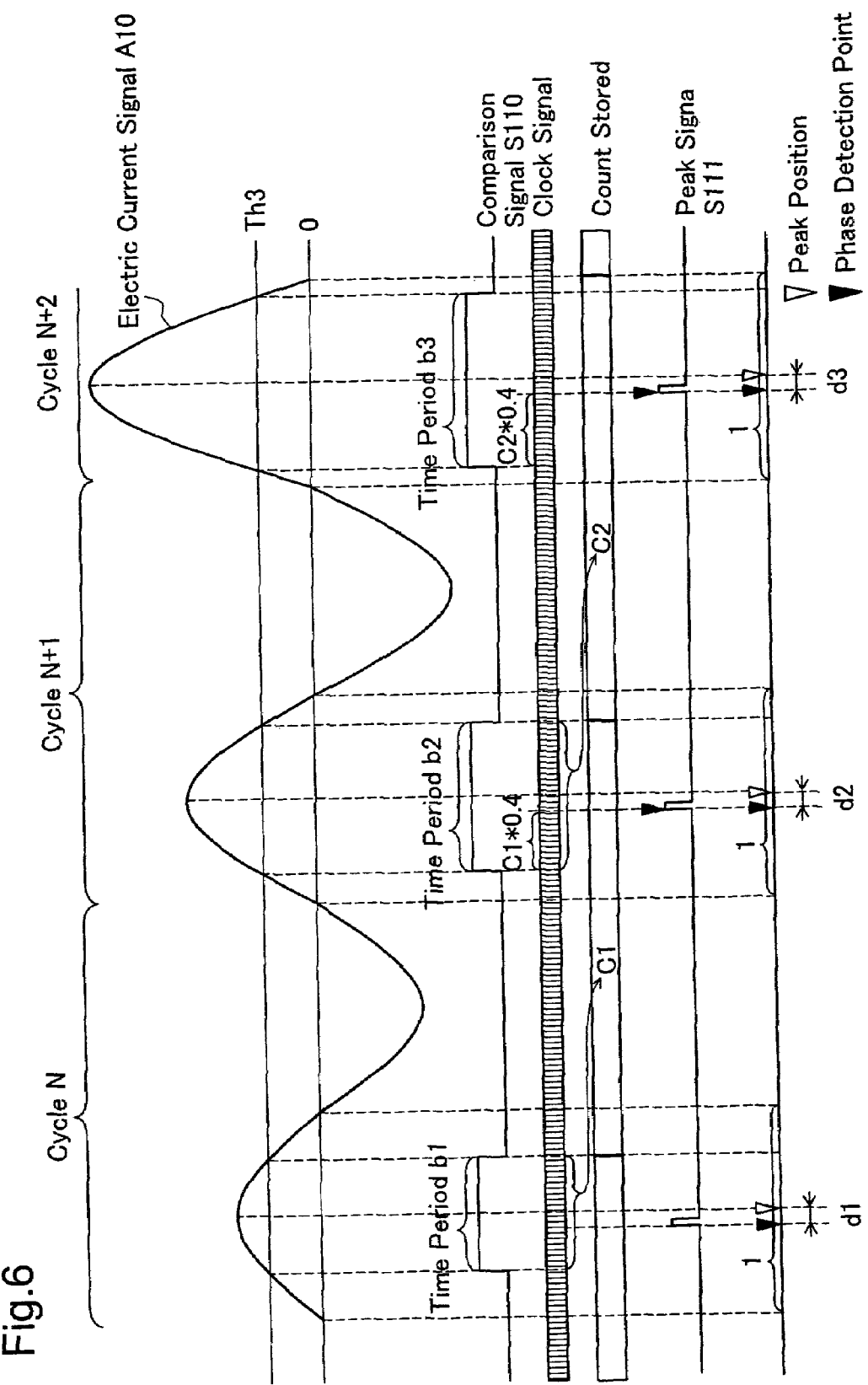
FIG. 6 shows generation of a peak signal S111 by the peak signal generator and specification of phase detection points.

FIG. 6 shows generation of the peak signal S111 by the peak signal generator 200 and specification of the phase detection points.

The upper half of FIG. 6 shows the waveform of the electric current signal A10, and the lower half shows the comparison signal S110, the clock signal output from the clock circuit 310 (see FIG. 4), the count stored in the count storage element 330, and the peak signal S111 with phase detection points and peak positions.

The abscissa, the ordinate, the open triangles, the closed triangles, the cycles N to (N+2), and the time periods 'b1' to 'b3' in FIG. 6 have the same definitions as those of the abscissa, the ordinate, the open triangles, the closed triangles, the cycles N to (N+2), and the time periods 'b1' to 'b3' in FIG. 5 and are thus not specifically described here. The time lengths 'd1' to 'd3' at the bottom of FIG. 6 respectively denote the time periods between the peak positions and the phase detection points in the cycles N to (N+2) when the ½ cycle (0 to π) is assumed to be '1'.

In the state of FIG. 6, the current cycle (N+1) starts after the end of the previous cycle N. The counter 320 (see FIG. 4) counts up the number of clocks in the high-level period 'b1' of the previous cycle N and stores the accumulated number of clocks as a count C1 into the count storage element 330. The multiplication circuit 350 multiplies the count C1 by the operation value '0.4' stored in the operation value storage element 340 and stores the operation result of 'C1*0.4' into the operation result storage element 360.

When the electric current A10 reaches the threshold value Th3 in the current cycle (N+1), the comparison signal S110 rises to the high level. The counter 320 (see FIG. 4) starts counting the number of clocks at the rise of the comparison signal S110. The comparator 370 successively compares the accumulated count (the accumulated number of clocks) by the counter 320 with the operation result of 'C1*0.4' stored in the operation result storage element 360. When the accumulated count reaches the operation result of 'C1*0.4', the peak signal S111 rises to and is kept at the high level for a predetermined time period. At a fall of the comparison signal S110 from the high level to the low level, that is, at the end of the time period 'b2', the counter 320 writes the accumulated count C2 at the moment over the stored count 'C1' in the count storage element 330.

The multiplication circuit 350 multiplies the count 'C2' by the operation value '0.4' stored in the operation value storage element 340 and writes the operation result of 'C2*0.4' over the stored operation result of 'C1*0.4' in the operation result storage element 360.

The comparison signal S112 of the sinusoidal signal A1 to be input into the phase comparator 230 is generated by comparison between the preset threshold value Th4 and the sinusoidal signal A1 in the voltage comparator 224. The comparison signal S112 is thus identical with the comparison signal shown in FIG. 8(A).

The phase comparator 230 (see FIG. 3) receives the peak signal S111 and the comparison signal S112 and makes comparison between the phase detection points of the electric current signal A10 and the sinusoidal signal A1.

The phase comparator 230 detects a rising position in each cycle of the peak signal S111 and sets the detected rising position to the phase detection point in the cycle of the electric current signal A10. In the current cycle (N+1), the position of 'C1*0.4' from the rising position of the time period 'b2' is accordingly specified as the phase detection point. Similarly in the next cycle (N+2), the position of 'C2*0.4' from the rising position of the time period 'b3' is specified as the phase detection point.

As shown in FIG. 6, there is a significantly small change in high-level period of the comparison signal S110 between adjacent cycles. Especially in the sinusoidal signal A1 having the frequency close to the resonant frequency, the electric current signal A10 has practically fixed amplitude and has substantially equal high-level periods in the individual cycles. The time lengths 'd1' to 'd3' shown in FIG. 6 are thus all sufficiently close to '0.1' when the ½ cycle (0 to π) is assumed to be '1'. Namely the respective phase detection points of the electric current signal A10 have substantially fixed positional relations to the corresponding peak positions.

The phase comparator 230 detects a rising position in each cycle of the comparison signal S112 and sets the detected rising position to the phase detection point in the cycle of the sinusoidal signal A1. The phase detection points of the respective cycles of the sinusoidal signal A1 are set at the positions shifted by '0.1' from the corresponding peak positions when the ½ cycle (0 to π) is assumed to be '1'. Namely the respective phase detection points of the sinusoidal signal A1 have the fixed positional relation to the corresponding peak positions.

The phase comparator 230 then makes comparison between the phase detection points of the electric current signal A10 and the sinusoidal signal A1 at the substantially fixed relative positions to the corresponding peak positions. Even under the condition of varying amplitude of the electric current signal A10, the phase comparator 230 can detect the phase difference between the electric current signal A10 and the sinusoidal signal A1 with sufficiently high accuracy.

A4. Effects of Embodiment

As described above, the waveform generator 100 sets the phase detection point in each cycle of the electric current signal A10 not at a rising position in the cycle of the comparison signal S110 but at a position shifted by '0.1' from the peak position of each high-level period of the comparison signal S110 assumed to be '1'. The phase detection points are accordingly set at the positions shifted by approximately '0.1' from the peak positions of the respective cycles when the ½ cycle (0 to π) is assumed to be '1'. Namely the respective phase detection points have substantially fixed positional relations to the corresponding peak positions.

The sinusoidal signal A1 has fixed amplitude and accordingly has the phase detection points set at the fixed relative positions to the corresponding peak positions. This enables phase comparison between the electric current signal A10 and the sinusoidal signal A1 at the phase detection points set at the substantially fixed relative positions to the corresponding peak positions.

Even under the condition of varying amplitude of the electric current signal A10, the phase comparator 230 detects the phase difference between the electric current signal A10 and the sinusoidal signal A1 with sufficiently high accuracy and outputs the phase difference signal P1 representing the practically accurate phase difference to the sine wave generator 240. This arrangement enables the sine wave generator 240 to adequately adjust the frequency of the sinusoidal signal A1 and to stably keep on the discharge lamp 10.

B. Modifications

The embodiment discussed above is to be considered in all aspects as illustrative and not restrictive. There may be many modifications, changes, and alterations without departing from the scope or spirit of the main characteristics of the present invention. Some examples of possible modification are given below.

B1. MODIFIED EXAMPLE 1

In the liquid crystal projector 1000 of the embodiment described above, the voltage corresponding to the sinusoidal signal A1 is applied to the resonant unit 150. The source signal of the applied voltage may not be a sinusoidal wave but may have another waveform. Operation values may be determined corresponding to the respective waveforms and stored in the operation value storage element 340 (see FIG. 3).

FIG. 7 shows the waveforms of source signals and applied voltage signals and operation values set for the respective waveforms in Modified Example 1.

A sawtooth wave 1 of FIG. 7 has a peak position shifted by '0.8' from a start position of each cycle that is assumed to be '1'. Setting an operation value of '0.7' enables specification of a phase detection point relatively close to the peak position.

A sawtooth wave 2 has a peak position shifted by '0.2' from a start position of each cycle. A triangular wave and a sinusoidal wave respectively have peak positions shifted by '0.5' from start positions of their cycles. Operation values may be determined to set the phase detection points at the positions shifted by '0.1' and by '0.4' from the respective start positions, which are sufficiently close to the corresponding peak positions. This arrangement enables phase comparison at the phase detection points sufficiently close to the peak positions in various waveforms.

The operation value may not be fixed but may be varied in a preset range, for example, in a range of '0.7' to '0.8' for the sawtooth wave 1. The operation value adopted may be any value selected in the preset range.

B2. MODIFIED EXAMPLE 2

The procedure of the embodiment sets the phase detection point of each cycle to the position shifted by '0.1' from the center position of each high-level period of the comparison signal S110 assumed to be '1'. The phase detection point is, however, not restricted to the position shifted by '0.1' from the center position. A closer position to the peak position, for example, a position shifted by '0.05' from the center position, may be specified as the phase detection point.

In this modification, the phase detection point corresponds to the position of 10% before the center position in the specific time length between the start position and the center position in each high-level period of the comparison signal S110. According to the calculation similar to Equation (1) given above, the phase detection point is set at the position of 45% from the rising position in each high-level period of the comparison signal S110, which is assumed to be 100%. The modified procedure accordingly sets the operation value to '0.45' and changes the threshold value Th4 of the sinusoidal signal A1 to set each phase detection point at the position shifted by '0.05' from each corresponding peak position.

The procedure of the embodiment sets the phase difference between the electric current signal A10 and the sinusoidal signal A1 equal to 0. The operation value may be changed to set and keep the phase difference between the electric current signal A10 and the sinusoidal signal A1 to any arbitrary level. For example, the phase difference may be set to a different level by changing the operation value from '0.4' to '0.45' while keeping the threshold value Th4 of the sinusoidal signal A1 unchanged.

In this modified example, the phase detection points of the electric current signal A10 are set at the positions having the substantially fixed positional relations, that is, shifts of approximately '0.05', to the respective peak positions when the ½ cycle (0 to π) is assumed to be '1'. The phase detection points of the sinusoidal signal A1 are, on the other hand, set at the positions having the fixed positional relation, that is, a shift of '0.1', to the respective peak positions. Namely the electric current signal A10 and the sinusoidal signal A1 keep the phase difference of approximately '0.05' in each cycle.

The procedure of the embodiment sets the position closer to the peak position of the maximum value to each phase detection point. The position close to a peak position of the minimum value may alternatively be set to each phase detection point. In this modified arrangement, the phase detection points of the electric current signal A10 are set at the positions shifted by a preset rate, for example, 80%, from falling positions of respective high-level periods of the comparison signal S110. The threshold value Th4 is determined adequately to set the phase detection points of the sinusoidal signal A1 at the positions relatively close to the peak positions of the minimum value.

B3. MODIFIED EXAMPLE 3

The embodiment regards the liquid crystal projector 1000. The technique of the invention is, however, not restricted to the liquid crystal projectors but is also applicable to DLP (digital light processing: registered trademark) projectors as well as to illumination equipment for automobiles, such as head lamps, and other illumination devices that utilize a resonant circuit to control lighting of a discharge lamp. The technique of the invention is also applicable to various control circuits for lamp and non-lamp discharge controls and to diversity of other control circuits that utilize a resonant circuit to control the operations of discharge lamps, piezoelectric motors, and variety of other actuators. The technique of the invention is further applicable to resonant control in atomic clocks, laser oscillation control circuits, and radio wave tuning control circuits.

B4. MODIFIED EXAMPLE 4

The waveform generator 100 of the embodiment makes comparison between the phase of the electric current generated in the resonant circuit and the phase of the sinusoidal signal A1. The technique of the invention is not restricted to such phase comparison but is applicable to detect the peak positions of electric current in the resonant circuit in any control circuit that controls the operations of, for example, the discharge lamp or an actuator. The phase detection points described in the embodiment are specifiable as the peak positions.

The positions having practically fixed positional relations to the actual peak positions are detectable as the peak positions. The peak positions are thus detectable within an allowable error range even under the condition of varying amplitude of the electric current in the resonant circuit.

The technique of the invention is not restricted to the electric current in the resonant circuit but is applicable to any analog signals having varying amplitudes. Peak positions of these analog signals are thus detectable within an allowable error range.

B5. MODIFIED EXAMPLE 5

The discharge lamp controller 20 of the embodiment measures the electric current in the resonant circuit with the electric current sensor 140 and makes comparison between the phase of the electric current signal A10 representing the measured electric current and the phase of the sinusoidal signal A1. In one modified configuration, a voltage sensor measures a voltage actually applied to the resonant unit 150 and outputs the measured voltage as an analog signal. The waveform generator 100 then compares the phase of the input analog signal with the phase of the sinusoidal signal A1.

Finally the present application claims the priority based on Japanese Patent Application No. 2005-64691 filed on Mar. 9, 2005, which is herein incorporated by reference.

What is claimed is:

1. A specific phase position detection circuit that detects a time position to have a specific phase as a specified phase position in each cycle of an analog signal, the specific phase position detecting circuit comprising:
   a first detection unit that detects a time position where a signal level of the analog signal is matched with a preset threshold value, as a reference position;
   a measurement unit that measures a time length based on the detected reference position, as a reference time period;
   a computation unit that computes a time period at a preset rate to the measured reference time period, as an additional time period; and
   a second detection unit that detects a time position based on the detected reference position and the computed additional time period, as the specific phase position, and outputs a detection signal representing the detected specific phase position.

2. A specific phase position detection circuit that detects a time position to have a specific phase as a specified phase position in each cycle of an analog signal, the specific phase position detecting circuit comprising:
   a measurement unit that detects two time positions where a signal level of the analog signal is matched with a preset first threshold value, as a first reference position and a second reference position in each cycle of the analog signal, and measure a time length between the first reference position and the second reference position, as a reference time period;
   a computation unit that computes a time period at a preset rate to the reference time period measured in each previous cycle, as an additional time period in each current cycle of the analog signal; and
   a detection unit that detects a time position shifted from the first reference position detected in a current cycle by the addition time period computed by the computation unit; as the specific phase position, and outputs a detecting signal representing the detected specific phase position.

3. A specific phase position detecting circuit in accordance wit claim 2, wherein the analog signal is output from a resonant circuit.

4. A waveform generation circuit that comprises a specific phase position detection circuit in accordance with claim 3 and outputs a voltage signal representing a voltage waveform to a resonant driving unit, which applies a voltage to the resonant circuit, the waveform generation circuit comprising:
   a waveform generator that generates the voltage signal;
   a positional signal output unit that receives the voltage signal generated by the waveform generator, detects two time positions where a signal level of the voltage signal is matched with a preset second threshold value, as a third reference position and a fourth reference position in each cycle of the voltage signal, and outputs a positional signal representing at least either the third reference position or the fourth reference position; and
   a phase comparator that receives the detection signal output from the specific phase position detection circuit and the positional signal output from the positional signal output unit, compares the specific phase position represented by the received detection signal with either the third reference position or the fourth reference position represented by the received positional signal to detect a phase different between the analog signal and the voltage signal, and outputs a phase different signal representing the detected phase difference,
   wherein the waveform generator receives the phase difference signal output from the phase comparator and adjusts a frequency of the voltage signal based on the phase different represented by the received phase difference signal.

5. An electronic device comprising a waveform generation circuit in accordance with claim 4.

6. A discharge lamp control device that comprises a waveform generation circuit in accordance with claim 4 and controls lighting of a discharge lamp,
   wherein the discharge lamp is connected to the resonant circuit and is discharged and lit on by the voltage applied to the resonant circuit by the resonant driving unit.

7. A projector comprising a discharge lamp control device in accordance with claim 6 and a discharge lamp.

8. A method for modifying a frequency of a voltage of a circuit that detects a specific phase position by detecting a time position to have a specific phase as a specific phase position in each cycle of an analog signal, the frequency modifying method comprising the steps of:
   (a) detecting by a first detection unit, two time positions where a signal level of the analog signal is matched with a preset threshold value, as a first reference position and a second reference position in each cycle of the analog signal;
   (b) measuring a time length between the first reference position and the second reference position, as a reference time period;
   (c) computing a time period at a preset rate to the reference time period measured in each previous cycle, as an additional time period in each current cycle of the analog signal;
   (d) detecting, by a second detection unit, a time position shifted from the first reference position detected in a current cycle by the additional time period, as the specific phase position; and
   (e) modifying the frequency of voltage applied to the circuit based on the detected specific phase position.

* * * * *